(12) United States Patent
Dewimille et al.

(10) Patent No.: US 6,615,878 B2
(45) Date of Patent: Sep. 9, 2003

(54) PIPE THERMALLY INSULATED BY AN ELASTOMERIC MATERIAL AND MANUFACTURING METHOD

(75) Inventors: Bernard Dewimille, Corbeil Essone (FR); Jacques Jarrin, Nanterre (FR); Fabrice Dal Maso, Rueil Malmaison (FR)

(73) Assignee: Institut Francais du Petrole, Rueil-Malmaison cedex (FR)

( * ) Notice: Subject to any disclaimer, the term of this patent is extended or adjusted under 35 U.S.C. 154(b) by 0 days.

(21) Appl. No.: 10/225,188

(22) Filed: Aug. 22, 2002

(65) Prior Publication Data
US 2003/0005971 A1 Jan. 9, 2003

Related U.S. Application Data

(62) Division of application No. 09/440,283, filed on Nov. 15, 1999, now Pat. No. 6,461,554.

(30) Foreign Application Priority Data

Nov. 16, 1998 (FR) ............................................. 98/14383

(51) Int. Cl.[7] ............................................... F16L 11/00
(52) U.S. Cl. ...................... 138/149; 138/148; 138/141; 138/137; 138/145
(58) Field of Search ................................ 138/149, 140, 138/144, 145, 141, 137

(56) References Cited

U.S. PATENT DOCUMENTS

| | | | | |
|---|---|---|---|---|
| 3,388,724 A | * | 6/1968 | Mowell et al. ............. | 138/149 |
| 3,404,203 A | | 10/1968 | Donald ....................... | 264/108 |
| 3,607,492 A | | 9/1971 | Keith ......................... | 156/79 |
| 3,607,505 A | | 9/1971 | Schirmer ..................... | 156/156 |
| 3,642,396 A | | 2/1972 | Meneidis ................. | 425/133.1 |
| 3,830,899 A | * | 8/1974 | Piccioli et al. ............. | 138/141 |
| 3,877,136 A | | 4/1975 | Groch et al. ............. | 29/890.14 |
| 3,879,505 A | | 4/1975 | Boutillier et al. ............. | 264/48 |
| 3,957,942 A | | 5/1976 | Meudec ....................... | 264/235 |
| 3,979,818 A | | 9/1976 | Groch et al. ............... | 29/455.1 |
| 4,009,975 A | | 3/1977 | Ninomiya et al. ............ | 425/66 |
| 4,115,502 A | | 9/1978 | Rasmussen ............ | 264/171.11 |
| 4,146,562 A | | 3/1979 | Fukushima ................ | 264/45.5 |
| 4,161,231 A | * | 7/1979 | Wilkinson ................... | 181/292 |
| 4,209,476 A | | 6/1980 | Harris ....................... | 264/40.4 |
| 4,211,595 A | | 7/1980 | Samour ....................... | 156/187 |
| 4,289,716 A | | 9/1981 | Voigt ......................... | 264/45.9 |
| 4,345,363 A | | 8/1982 | Leuchs ....................... | 29/527.4 |
| 4,389,366 A | | 6/1983 | Hoesslin ..................... | 264/558 |
| 4,397,797 A | | 8/1983 | Nojiri ........................ | 264/45.5 |
| 4,417,603 A | | 11/1983 | Argy ......................... | 138/149 |
| 4,477,106 A | * | 10/1984 | Hutchison .................... | 285/47 |
| 4,484,877 A | | 11/1984 | Stucke ....................... | 425/113 |
| 4,519,863 A | | 5/1985 | Landgraf ............... | 156/244.12 |
| 4,657,050 A | | 4/1987 | Patterson ................... | 138/149 |
| 4,660,861 A | | 4/1987 | Argy et al. .................. | 285/45 |

(List continued on next page.)

FOREIGN PATENT DOCUMENTS

GB 2081415 2/1982

*Primary Examiner*—Patrick Brinson
(74) *Attorney, Agent, or Firm*—Antonelli, Terry, Stout & Kraus, LLP

(57) ABSTRACT

The present invention relates to a method intended for heat insulation of a pipe (1), comprising the following successive stages of depositing, on the outer surface of the pipe moving longitudinally, a thickness (3) of an insulating material made of elastomer having an elastic type behavior, substantially without irreversible plastic deformation, forming at least one circumferential slot (4) in the thickness of the material substantially orthogonally to the axis (2) of the pipe, and coating the insulating material thickness with a sealed sheath. In a variant, the slot is machined in the thickness of the insulant. The invention further relates to a heat-insulated pipe.

3 Claims, 3 Drawing Sheets

U.S. PATENT DOCUMENTS

| | | | |
|---|---|---|---|
| 4,729,807 A | 3/1988 | Hede | 156/172 |
| 4,859,380 A | 8/1989 | Ogata | 264/474 |
| 4,878,520 A | 11/1989 | Nakamura | 138/149 |
| 4,921,018 A | 5/1990 | Dridi | 138/149 |
| 4,929,294 A | 5/1990 | Blome | 156/187 |
| 4,929,409 A | 5/1990 | Agren | 264/508 |
| 5,056,564 A * | 10/1991 | Roth | 138/149 |
| 5,722,462 A | 3/1998 | Dridi | 138/149 |
| 6,012,494 A * | 1/2000 | Balazs | 138/119 |
| 6,079,452 A | 6/2000 | Touzel | 138/149 |
| 6,174,478 B1 | 1/2001 | Silver | 264/171.2 |
| 6,283,160 B1 * | 9/2001 | Hardy et al. | 138/129 |
| 6,461,554 B2 * | 10/2002 | Dewimille et al. | 264/162 |
| 6,530,137 B1 * | 3/2003 | Dewimille et al. | 29/527.2 |

* cited by examiner

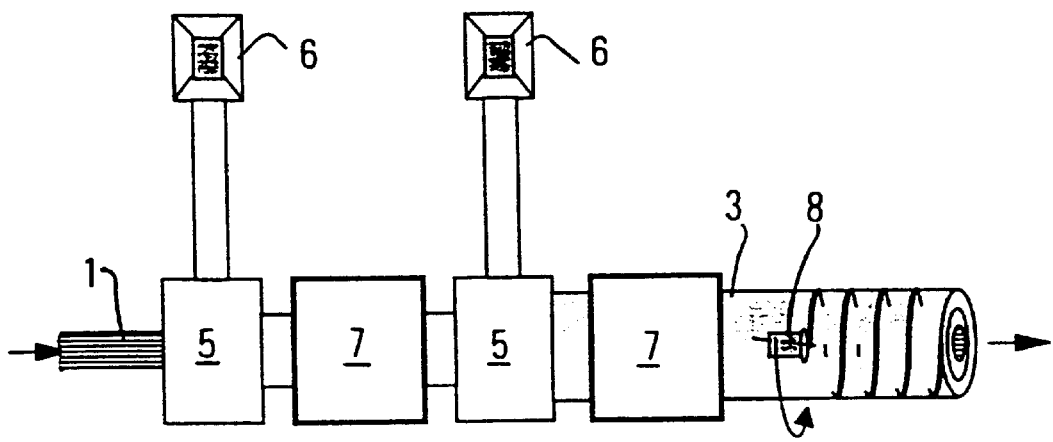
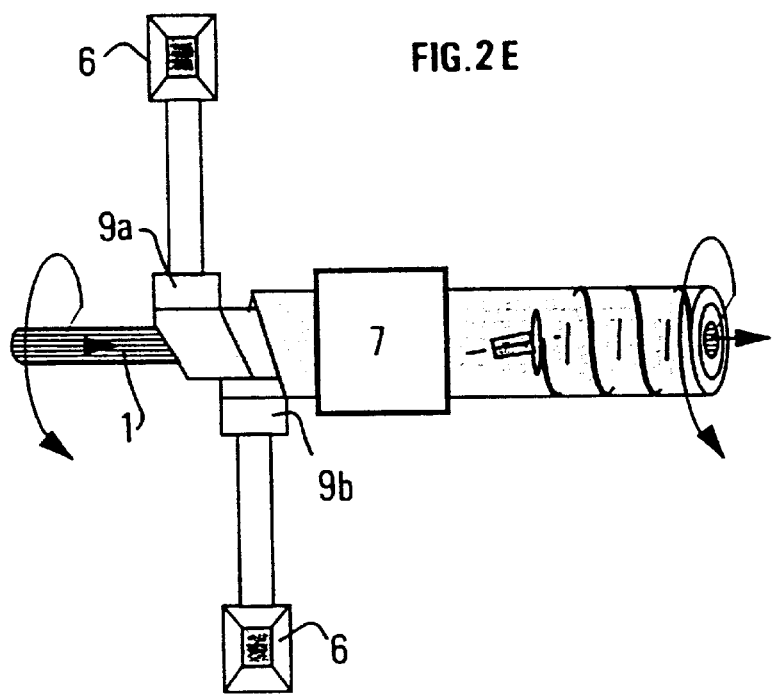

PIPE THERMALLY INSULATED BY AN ELASTOMERIC MATERIAL AND MANUFACTURING METHOD

CROSS REFERENCE TO RELATED APPLICATION

This application is a divisional application of U.S. Ser. No. 09/440,283, filed Nov. 15, 1999, now U.S. Pat. No. 6,461,554.

FIELD OF THE INVENTION

The present invention relates to a heat-insulated flexible pipe used for example for carrying effluents produced by oilwells, or for shipping or land carriage of liquid requiring thermal insulation.

The problem of thermal insulation of subsea petroleum production pipes arises in particular for reservoirs whose effluents, subjected to fast cooling due to the sea bottom temperature and to the thickness of the water depth, undergo physico-chemical phenomena that disturb their flow in the pipe. Hydrate formation, paraffin, asphaltene deposition or oil gelation may notably occur.

The term flexible pipes refers here to pipes consisting of polymer layers and metal reinforcing armours, and also to wound, then unwound metal tubes. In fact, the problem of thermal insulation is the same for both types of pipe: the thickness of the insulating material must not stiffen the pipe so that it can be used in the same way as a pipe without an insulant. In other words, the "flexibility" or the "rigidity" of the pipe must be substantially identical, with or without an insulant.

BACKGROUND OF THE INVENTION

Document EP-4,006,689 describes a flexible pipe thermally insulated by helical winding of strips made of expanded plastic. These relatively thin strips are wound by elastic deformation around the core of the flexible pipe. The insulating material selected should therefore allow implementation of this winding operation, which is furthermore quite extensive since several layers are necessary, while having a sufficient characteristic as regards heat insulation and mechanical strength under difficult hydrostatic pressure conditions. However, this solution is not appropriate with a high outside pressure because the wound strips do not withstand high compressive stresses.

Rigid plastic or elastomeric materials are well-suited for insulation and mechanical strength, but they pose a flexibility problem with great thicknesses. Elastomer type materials undergo no plastic deformation, they however stiffen the pipe too much when their thickness is great, i.e. of the order of several centimeters.

SUMMARY OF THE INVENTION

The present invention thus relates to a method intended for heat insulation of a flexible pipe according to the definition given here, comprising the following successive stages:

depositing, on the outer surface of the pipe moving longitudinally, a thickness of insulating material made of elastomer, having an elastic behaviour, forming at least one circumferential slot in said thickness of the material in relation to the axis of the pipe so as to restore or to preserve the flexibility of the pipe once coated with the insulating material, coating the insulating material thickness with a sealed sheath.

In a first variant, the slot can be made by machining.

In a second variant, the slot can be made as the material is deposited on the pipe, for example by winding strips with a gap corresponding to the width of the slot.

According to the invention, the slot can be helical, with a determined width and pitch according to the allowable bending radius of the flexible pipe.

In a variant, the slot can consist of a succession of circular slots having a determined width and pitch according to the allowable bending radius of the flexible pipe. The term pitch refers here to the distance between two slots on a generatrix of the pipe.

An extruding head can be concentric to the pipe.

In a variant, an extruding head can be arranged laterally to the pipe and revolve in relation to the pipe so as to deposit said material in the form of a helical strip.

The insulating material can be deposited in several successive layers so as to obtain great insulating material thicknesses.

In the case where the operation is carried out with several layers, each layer can comprise machined slots.

The invention also relates to a heat-insulated flexible pipe comprising at least one layer of an insulating material made of elastomer, having an elastic behaviour and deposited on the outside of the pipe. The layer comprises means for restoring the flexibility of the insulated pipe in the form of at least one circumferential slot and it is coated with a sealed sheath.

In the pipe, the width and the pitch of the slots can be calculated according to the allowable bending radius of the pipe.

The insulating material of the pipe is sufficiently elastic to fill in the slot when the pipe is subjected to the hydrostatic pressure.

BRIEF DESCRIPTION OF THE DRAWINGS

Other features and advantages of the present invention will be clear from reading the description hereafter of non limitative examples, illustrated by the accompanying drawings wherein:

FIGS. 2a to 2e show different manufacturing method variants for the pipe according to the invention.

DETAILED DESCRIPTION

Figure 1A:
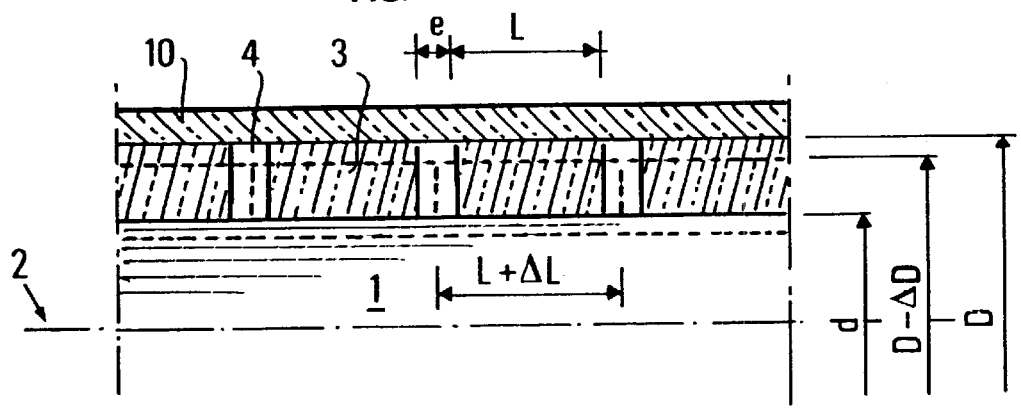
FIGS. 1a and 1b show the principle of the invention.
Figure 1B:
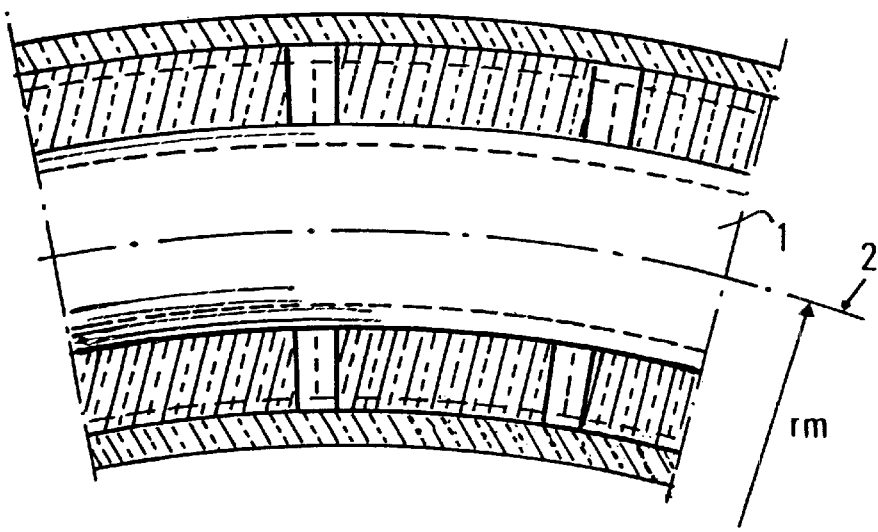

FIGS. 1a and 1b show, in longitudinal section, a flexible pipe 1 of allowable winding radius rm and of longitudinal axis 2. The diameter of the insulated pipe is D. The elongation ratio proportion of the outer fiber can be calculated as follows:

A=D/2 rm (%), assuming that the flexurally neutral fiber is situated on the longitudinal axis 2 of the pipe.

According to the pitch p between two successive slots 4 formed or cut in the layer 3 of insulating material, the width of the slots e and the pitch p can be estimated by taking into account an elongation proportion value generally allowed for high-pressure pipes, generally between 5 and 8%.

For example, for a 7% elongation and a slot of width e=3 mm, the pitch p between the slots should be about (3/7)× 100=43.

This means that, in this case, circumferential slots 4 should be spaced out by about 50 mm or, if the hollow consists of a helical slot, the spiral pitch should be about 50 mm. FIG. 1b diagrammatically shows the role of the slots in restoring the flexibility of the pipe despite the rigidity of the insulating material in the case where the outside pressure applied to sealed sheath 10 does not lead to compressive deformation of the insulating material.

The invention uses here an elastomeric insulating material whose elastic modulus is much lower than that of a plastic material, for example below 100 MPa, and often of the order of some Mega Pascals. The material selected has a highly elastic behaviour for extensive deformation (rubber elasticity).

When handling the pipe under low hydrostatic pressure (at the surface or in shallow water), the insulating material is not deformed or not much, and the slots allow a good pipe flexibility to be preserved.

When the pressure increases, the material under external compression transmitted by sealed sheath 10 is deformed and the slots are progressively filled. The flexibility of the pipe is then decreased since there is no slot effect any more, but the elastic modulus of the elastomer being low, the global rigidity remains lower than in the case of insulation with a material having a higher modulus.

Under deep water (high pressure), the slots being filled, the layer of elastomeric material becomes nearly incompressible (the hydrostatic bulk modulus being of the order of 1000 to 2000 MPa). The thickness of this insulating layer is thus not altered any more. Furthermore, if the outer sheath breaks, insulation cannot be modified by the water. Filling of the slots also has the advantage of eliminating a possible problem of creep of the outer sheath in the slots under the effect of the outside hydrostatic pressure. In fact, this problem can persist with rigid insulating materials separated by slots that are not filled.

The order of magnitude of the compressive deformation of the insulating material can be estimated by means of FIG. 1a.

The outside diameter of the insulant decreases from D to D−ΔD and the width between the slots increases from L to L+ΔL. The diameter d of the pipe is considered not to vary.

The volume V is $V = \pi/4(D^2 - d^2)L$.

The material is considered to be incompressible, therefore ΔV=0.

We thus have $\Delta D/D = -(\Delta L/L) \times (D^2 - d^2)/2D^2$.

Numerical applications:

with: d=30 cm, D=40 cm and ΔL/L=0.05, we have ΔD/D≈0.01;

with: d=30 cm, D=44 cm and ΔL/L=0.05, we have ΔD/D≈0.0134.

The outer sheath should therefore withstand a diameter decrease of about 1%, i.e. a compression of some per cents, which is allowable for the pipes according to the present invention.

FIGS. 1a and 1b show, in dotted lines, the theoretical shape (dimensions have been exaggerated for visibility reasons) taken by the elastic insulant under compression in the substantially rectilinear position of the pipe and in a bent position.

The elastic behaviour of these elastomers is reversible, i.e. when a pipe thus insulated is lifted from the sea bottom, the slots are cleared as a result of the decompression of the material (this reversibility is more or less partial according to the type of elastomer used, an elastomer having a low remanent deformation under compression must therefore be selected). After decompression, the flexibility of the pipe is restored.

The elastomeric materials can be cross-linked type (cured) or thermoplastic type materials. In general, chemically cross-linked elastomers have a better resilience than thermoplastic materials. The latter are however easier to use.

The thermal conductivity of these materials is of course higher than that of lighter materials (foams, . . . ). It ranges most often between 0.15 and 0.40 W/mK. But foams do not withstand pressures above several Mega Pascals. The heat insulation characteristics can however be improved by using an elastomer containing hollow balls that must withstand the desired hydrostatic pressure. The hollow glass microspheres used in syntactic materials are for example well-known.

FIGS. 2a to 2e diagrammatically show manufacturing means according to the invention.

In the present invention, the term circumferential slot designates circular (annular) slots, continuous or discontinuous (i.e. the slot is cut only in a portion of the circumference), slots arranged according to a continuous or discontinuous helix.

Reference number 1 designates the flexible pipe to be insulated by means of the layer(s) 3 of insulating material extruded by an extrusion die 5 supplied with fluidized material by extruder 6. The layer of insulating material is hardened by fast cooling in cooling means 7. A cutting system 8 revolves around the pipe to machine the slots. The system consists of one or more saw blades driven by a motor. The cutting system revolves around the pipe to form slots over part or all of the periphery of the pipe. The system can be controlled according to the forward motion of the pipe so as to make one or more helical slots, or it can be stationary in relation to the pipe during the machining procedure in the case of a continuous circular slot and of a partly circular slot. In the latter variant, means for controlling the displacement sequence are required to reposition the saw in order to cut a new slot at a distance equal to the desired pitch, considering the longitudinal displacement of the flexible pipe as a whole. The depth of the slot is adjusted so as to be at most less than or equal to the thickness of the extruded insulant layer. In practice, adjustment allows a small thickness of insulant 11 (FIG. 1a) to remain, which does not hinder the flexibility of the insulated pipe but facilitates adjustment of the machining depth.

Figure 2A:
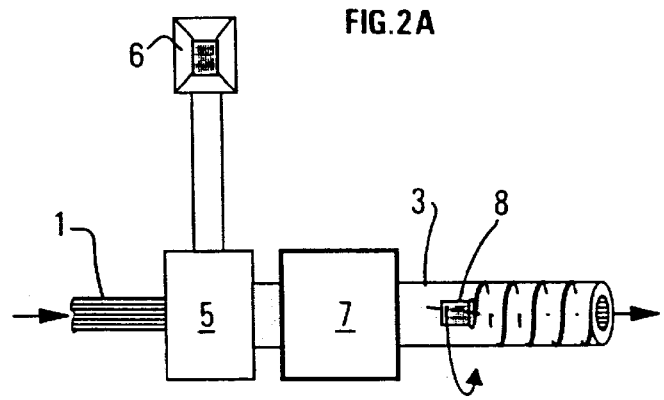
Figure 2B:
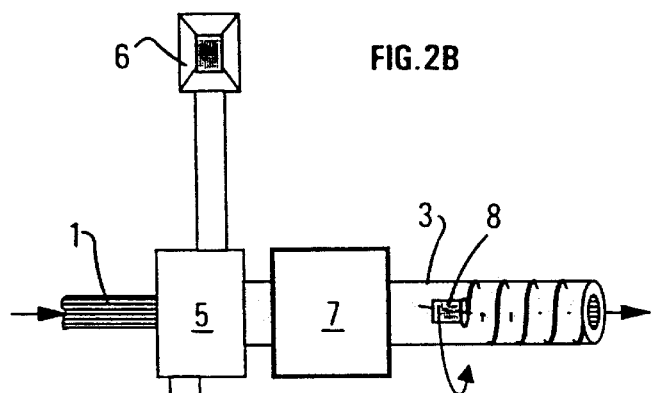

FIG. 2b shows a variant with two extruders and a single die. Considering the great thickness generally desired for the insulant, a second extruder can be necessary for feeding the die.

Figure 2C:
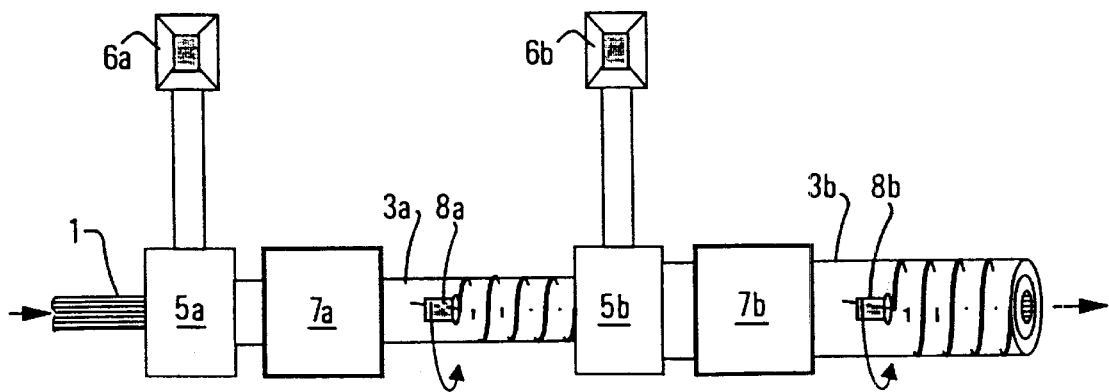

FIG. 2c illustrates another variant where extrusion of the insulating material is performed in several stages so as to have several successive layers allowing to obtain a relatively great final thickness. The first layer 3a can be cut by means of a first machining system 8a. The successive layers can also have their own machining system (8b for layer 3b). In this variant, a layer of tape is preferably placed on layer 3a so as to prevent the extrusion performed by die 5b from filling the slots machined in layer 3a. Using two separate extruders can allow layers of different materials to be deposited.

FIG. 2d shows a manufacturing variant having the same advantages as variant 2c, but the manufacturing device comprises a single slot machining system.

FIG. 2e illustrates a very particular use of the manufacturing method where there is no co-axial die as before, but radial extrusion openings 9a, 9b whose function is to deposit the insulating material in the form of helically wound strips on the flexible pipe.

Of course, in this case, either pipe 1 is driven in rotation around its longitudinal axis, or the extrusion system revolves around the pipe. The latter solution is difficult to implement, except if the device comprising the extrusion openings revolves around the pipe, the extruder itself remaining stationary and supplying the rotating die by means of a rotary joint. In the case of a rotating die that deposits a strip laterally, the helical slots can be formed directly by means of a specific forming device leaving a space corresponding to the desired slot width.

It is clear that all the materials that can be extruded and quickly cooled in order to be machined according to the present method are suited. Thermoplastic elastomeric materials are preferably used here. The flexible pipe comprises an extruded external sealed sheath 10 (FIG. 1a).

Figure 3:
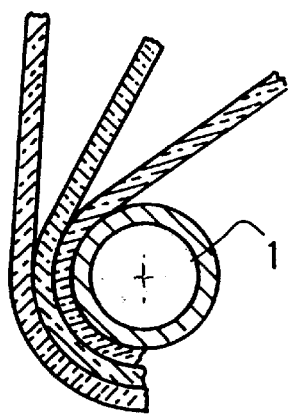
FIG. 3 shows another variant of the invention.

FIG. 3 is a sectional view of the winding principle according to which a strip of elastomeric material, as defined above, is wound around the pipe 1 to be insulated. The elastic modulus of the material is such that it can actually be wound in the form of a strip insofar as its thickness allows to do so. In this case, it is clear that the slots are obtained by helical deposition with a gap corresponding to the desired slot width. If a greater insulant thickness is desired, several strips can be wound on top of each other, as shown in the figure, with or without sticking.

What is claimed is:

1. A heat-insulated flexible pipe, comprising: a pipe, at least one insulating layer of an elastomeric material having an elastic behaviour provided on the outside of said pipe, at least one slot provided in said elastomeric material on said pipe for restoring flexibility to the insulated pipe, and an external sealed sheath covering said at least one layer of elastomeric material but not filling said at least one slot.

2. A pipe as claimed in claim 1, wherein the width and the pitch of said at least one slot are calculated according to the allowable bending radius of said pipe.

3. A pipe as claimed in claim 1, wherein the at least one insulating layer is an elastic material which fills said at least one slot when deformed when the pipe is subjected to hydrostatic pressure.

* * * * *